United States Patent [19]

Standing

[11] Patent Number: 4,861,645
[45] Date of Patent: Aug. 29, 1989

[54] FENCING TAPE WITH ELECTRICALLY CONDUCTING WIRES

[75] Inventor: Colin A. Standing, Cambridge, New Zealand

[73] Assignees: Joubert S. A., Ambert, France; Gallagher Electronics Limited, Hamilton, New Zealand

[21] Appl. No.: 141,186

[22] Filed: Jan. 6, 1988

[30] Foreign Application Priority Data

Jan. 6, 1987 [NZ] New Zealand ............ 218802

[51] Int. Cl.$^4$ .................................. B32B 7/00
[52] U.S. Cl. ................... 428/196; 428/101; 428/197; 428/209; 428/256; 428/259; 428/922
[58] Field of Search ............... 428/196, 197, 209, 256, 428/259, 922, 101

[56] References Cited

U.S. PATENT DOCUMENTS 4,567,094 1/1986 Levin .................... 428/256

Primary Examiner—Marion C. McCamish
Attorney, Agent, or Firm—Pollock, Vande Sande & Priddy

[57] ABSTRACT

A conductive tape for an electrifiable fence comprising a tape of woven or knitted construction having at least two conducting wires arranged longitudinally and integrally in the woven or knitted structure. A bridging conductor is carried in or on the knitted or woven structure and is directed transversely across the two longitudinal conductors at intervals, so that, if a break occurs in one of the conductors, the current path is capable of continuing via the bridging conductor.

12 Claims, 1 Drawing Sheet

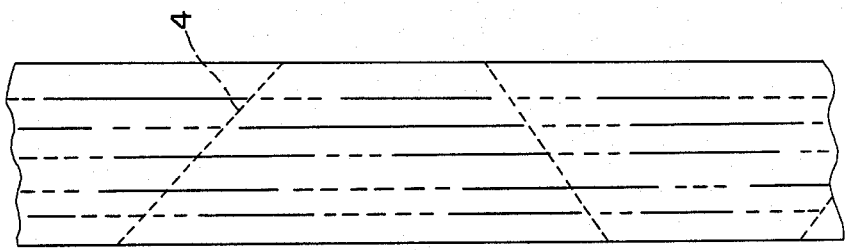
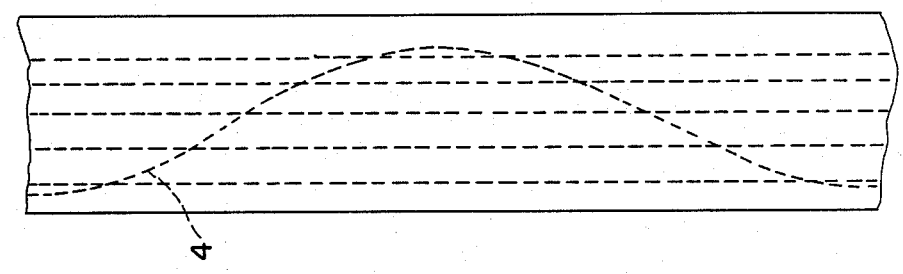
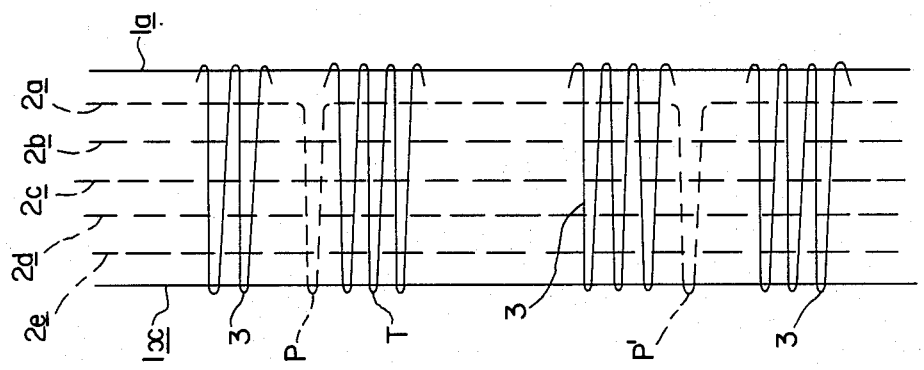

FENCING TAPE WITH ELECTRICALLY CONDUCTING WIRES

FIELD OF THE INVENTION

This invention concerns fencing tapes, and in particular those which contain conducting elements for use with electrifiable fences.

BACKGROUND OF THE INVENTION

We have experimented with a woven tape wherein the warps and weft are made of narrow plastic ribbon. The tape is rendered electrically conductive by the incorporation among the warps of several side-by-side fine gauge stainless steel wires. While this tape is an excellent conductor and offers good visibility to stock confined within a fence of which the tape is a part, faulty straining procedures or collisions between stock animals and the tape can spoil the conductivity of the tape, and it is not unusual when testing the tape to find non-conducting in the fence which the animals subsequently find and exploit.

SUMMARY OF THE INVENTION

This invention provides a conductive tape for an electrifiable fence comprising a tape of woven or knitted construction having at least two conducting wires arranged longitudinally and integrally in the woven or knitted structure, wherein a bridging conductor is carried in or on the knitted or woven structure and is directed transversely across the two longitudinal conductors at intervals, so that, if a break occurs in one of the conductors, the current path is capable of continuing via the bridging conductor.

The tape warps may be made of polyolefin, for example, polyethylene. The warps may include fine gauge stainless steel wires. There may be five such wires arranged equally across the width of the tape, namely, 20 mm. Alternatively polyester yarn such as polyethylene terephthalate may be used. Other non-conductive materials may also be used.

The weft may be the same material as the warps. The bridging conductor may be a single wire strand which is inserted as a weft pick every 500 mm or so. The bridging conductor would therefore pass from selvedge to selvedge for one pick and travel down one selvedge as an extra conducting warp strand. Alternatively, the bridging conductor may be a conductor strand which is sewn into the tape in a serpentine path so as to cross from selvedge to selvedge in a continuous undulating pathway. In another application, a continuous line of metallic composition is deposited on the face of the tape by a jet nozzle.

BRIEF DESCRIPTION OF THE DRAWINGS

Embodiments of the invention will now be described with reference to the accompanying drawings, in which:

FIG. 1 is a plan of a fragment of one embodiment of the tape and;

FIG. 2 is a plan of a fragment of another embodiment of the tape; and

FIG. 3 is a plan of a fragment of yet another embodiment of the tape.

DESCRIPTION OF PREFERRED EMBODIMENT

In a preferred embodiment, a tape is woven from polyethylene monofilaments and stainless steel wires in a weaving machine fed and controlled in such a manner that:

the warp is made of a number of polyethylene monofilaments, and of a number of stainless steel wires equally spaced across the tape and all able to conduct current when incorporated into an electric fence;

the weft is a polyethylene monofilament;

at least one of the warp steel wires periodically becomes a weftwire, crossing with electrical contact the other warp steel wires.

For instance, as schematically shown in FIG. 1, there are 24 warp polyethylene monofilaments 1 each 0.38 mm in diameter, five warp steel wires 2a to 2e each 0.15 mm in diameter, and one weft polyethylene monofilament 3 0.30 mm in diameter, and the width of the tape is about 14 mm. To simplify the drawing, only two selvedge polyethylene warps 1e, 1x are shown, whereas all five steel wires 2a to 2e are shown.

Outermost steel wire 2a is controlled to become at regular intervals a weft wire crossing the tape up to the opposite selvedge. The distance between two successive picks P,P' of such weft steel wire is about 65 mm, and there are about 24 picks T of the polyethylene weft between the picks P,P'.

The numerical features are optional and may change according to the various embodiments.

In the embodiment shown in FIG. 2, the tape is woven without a bridging conductor. Instead, the woven tape is fed into the path of a sewing machine (not shown) which inserts a bridging wire 4 in a serpentine path across the five warp wires. This can be arranged by placing the needle head between two pairs of laterally oscillating feed rolls. Alternatively, the needle head can be oscillated.

In the embodiment shown in FIG. 3, the tape is knitted along with 23 others on a warp knitting machine which utilizes fifteen polyethylene warps of equal count and five stainless steel warp wires, together with a bridging wire. During knitting, the bridging wire passes down one selvedge, crosses to the opposite selvedge in a diagonal path and travels along the opposite selvedge until it returns across a diagonal. This creates a modified saw tooth wave path in the ribbon and allows the bridging wire to contact each conductor as it traverses from selvedge to selvedge. The intervals between the diagonals are adjusted according to the intended end use of the tape. The interval may vary from 250–1250 mm, but the general purpose interval would be be 500–750 mm.

The tape is colored orange, yellow, banded black and yellow, but white is preferable. It has been found that white tape is more visible than tapes of other colors, more than would have been expected having regard to the contrast against the backgrounds of trees, grass, sky and water wherein the tape is likely to be used.

The tape according to the invention provides good visibility and retention of electrical conductivity despite breaks in the warp wires.

What I claim is:

1. A conductive tape for an electrifiable fence comprising a tape of woven or knitted construction having at least two conducting wires arranged longitudinally and integrally in the woven or knitted structure, including a bridging conductor carried in or on the knitted or woven structure and extending transversely across each of the at least two longitudinal conductors at intervals, so that, if a break occurs in one of the conductors, the current path is capable of continuing via the bridging conductor.

2. A conductive tape as claimed in claim 1, wherein the tape is woven and the bridging conductor is a conductive strand incorporated as an intermittent weft pick.

3. A conductive tape as claimed in claim 1, wherein the tape is warp knitted and the bridge conductor is a conductive strand incorporated as a warp thereof.

4. A conductive tape as claimed in claim 3, wherein there are two outermost conductors at least one intermediate conductor and the bridging conductor extends at least from one outermost conductor to the opposite outermost conductor.

5. A conductive tape as claimed in claim 1, wherein the bridging conductor is incorporated as a warp which periodically becomes a weft.

6. A conductive tape as claimed in claim 1, wherein the bridge conductor is a wire strand which is sewn into the tape in a serpentine path so as to cross from one outermost conductor th the opposite outer most conductor.

7. A conductive tape as claimed in claim 1, wherein the bridge conductor is a continuous line of metallic composition deposited on a face of the tape by a jet nozzle.

8. A conductive tape as claimed in claim 3 or 4, wherein the bridging conductor defines a square wave path in the tape.

9. A conductive tape as claimed in any one of claims 1 to 7, wherein the bridge conductor crosses the tape every 250-1250 mm.

10. A conductive tape as claimed in any one of claims 1 to 7, wherein the conductive strand is a wire.

11. A conductive tape as claimed in any one of claims 1 to 7, wherein the conductive strand is a ribbon of electrically conductive plastic.

12. A conductive tape as claimed in any one of claims 1 to 7, wherein the non-conducting parts of the tapes are white.

* * * * *